United States Patent
Sergachev

(10) Patent No.: US 8,906,834 B2
(45) Date of Patent: Dec. 9, 2014

(54) METAL TREATMENT COMPOSITION AND METHOD OF TREATING RUBBING SURFACES

(75) Inventor: Alexander Sergachev, Wilmette, IL (US)

(73) Assignee: Sergachev Technologies LLC, Buffalo Grove, IL (US)

( * ) Notice: Subject to any disclaimer, the term of this patent is extended or adjusted under 35 U.S.C. 154(b) by 0 days.

(21) Appl. No.: 13/983,884

(22) PCT Filed: Jan. 20, 2012

(86) PCT No.: PCT/US2012/021989
§ 371 (c)(1),
(2), (4) Date: Oct. 21, 2013

(87) PCT Pub. No.: WO2012/108994
PCT Pub. Date: Aug. 16, 2012

(65) Prior Publication Data
US 2014/0037864 A1     Feb. 6, 2014

Related U.S. Application Data

(60) Provisional application No. 61/439,978, filed on Feb. 7, 2011.

(51) Int. Cl.
| | |
|---|---|
| *C10M 125/00* | (2006.01) |
| *C10M 125/10* | (2006.01) |
| *C10M 125/26* | (2006.01) |
| *C23C 24/06* | (2006.01) |
| *C23C 26/02* | (2006.01) |
| *C23C 30/00* | (2006.01) |
| *C09D 7/00* | (2006.01) |

(52) U.S. Cl.
CPC .............. *C10M 125/26* (2013.01); *C23C 24/06* (2013.01); *C23C 26/02* (2013.01); *C23C 30/00* (2013.01); *C09D 7/00* (2013.01); *C10M 125/10* (2013.01); *C10M 125/00* (2013.01)
USPC ........... 508/154; 508/161; 508/165; 508/170; 508/171; 508/172

(58) Field of Classification Search
CPC . C10M 125/00; C10M 125/10; C10M 125/26
USPC .................. 508/154, 161, 165, 170, 171, 172
See application file for complete search history.

(56) References Cited

U.S. PATENT DOCUMENTS

| | | | |
|---|---|---|---|
| 2,901,380 A | 8/1959 | Crump et al. | |
| 4,502,950 A | * 3/1985 | Ikematsu et al. | ............... 208/309 |
| 4,915,856 A | 4/1990 | Jamison | |
| 7,304,020 B1 | 12/2007 | Tananko et al. | |

FOREIGN PATENT DOCUMENTS

| | | | |
|---|---|---|---|
| JP | 2005008748 A | | 1/2005 |
| JP | 2005008748 A | * | 1/2005 |

* cited by examiner

*Primary Examiner* — Taiwo Oladapo
(74) *Attorney, Agent, or Firm* — Miller, Matthias & Hull LLP

(57) ABSTRACT

A durable anti-wear coating for friction assemblies, a method of making the same and a method of using the same is provided. The method of use results in the formation of an anti-wear coating and selective carbonization of any ferrous surfaces by impregnating the surface layer with carbon, and makes it possible to selectively optimize the clearances between any bearing surface (ferrous or nonferrous). The method may take place during the standard operating process of the mechanism, without disassembly or with only partial disassembly.

15 Claims, No Drawings

METAL TREATMENT COMPOSITION AND METHOD OF TREATING RUBBING SURFACES

RELATED APPLICATION

This application is a national stage entry of PCT/US2012/021989, filed Jan. 20, 2012 which claims priority from provisional application 61/439978, which are incorporated by reference in their entirety

BACKGROUND

1. Field Of The Invention

This invention pertains to a durable anti-wear composition (coating), a method of making the anti-wear composition, and a method of using the anti-wear composition to treat metal components subject to frictional wear such as bearings. The composition and method of use make it possible to selectively optimize the clearances between any bearing surface (ferrous or nonferrous), and to obtain high carbonization of ferrous surfaces by impregnating the surface layers with carbon (by growing monocrystals) during the standard operating process of the mechanism without disassembly or with only partial disassembly.

2. Description of the Related Art

In recent years, a number of metal treatment products have appeared which use solid lubricant additives, including natural magnesium hydro-silicates such as Serpentine and Talc, to form coatings on rubbing surfaces. When these minerals are manufactured into a solid lubricant additive under specific conditions, mixed with binders between the rubbing surfaces, and burnt-in during normal operation causing the formation of a coating on the rubbing metal surfaces, significant changes in the wear of the rubbing surfaces have been observed.

There is also a known method of forming a coating on rubbing surfaces involving a pre-activated mixture of abrasive-like powder in an organic binder placed between the rubbing surfaces of elements of a friction pair. Once placed between the rubbing surfaces, the coating is burned-in during normal operation. The activated mixture contains the following ingredients with a dispersity (size range) of $0.1$-$2\mu$:

| | |
|---|---|
| Serpentinite | 0.5-40.0% mass, |
| Sulfur | 0.1-5.0% mass, and |
| Surfactant | 1.0-55.0% mass |

Also known is a method of forming a coating on rubbing surfaces consisting of grinding a mixture of raw minerals containing Serpentine, Enstatite and Magnetite or a combination of them, with at least one mineral selected from Amphibole, Biotite, Ilmenite, Pentlandite, Pyrrhotite, Talc, Chalcopyrite or native Sulfur, to a dispersity of $0.01$-$1.0\mu$. After the mechanical activation of the resulting solid lubricant additive with a binder is completed, the finished composition is placed between the rubbing surfaces and burnt-in. The composition make-up is:

| | |
|---|---|
| mineral mixture | 3.3% mass and |
| binder | 96.7% mass. |

This known method makes it possible to increase the mechanical strength of the surface of the metal, reduce the friction coefficient, eliminate surface defects and increase anticorrosive durability. However, this known method does not ensure the formation of a layer firmly bonded to the friction surface.

Thus there remains a need for a metal treatment additive that, when exposed to the heat of friction of metal rubbing surfaces, reacts with the metal surfaces to form a "monocrystalline metallic" (diamond like) layer which decreases the wear of the rubbing surfaces and minimizes the friction coefficient.

SUMMARY OF THE INVENTION

This invention pertains to a durable anti-wear metal treatment composition (also known as a solid lubricant additive), a method of making a durable anti-wear metal treatment composition, and a method of using the metal treatment composition to form a durable anti-wear coating in friction assemblies. The metal treatment composition makes it possible to selectively optimize the clearances between any bearing surface (ferrous or nonferrous), and to obtain high carbonization of ferrous surfaces by impregnating the surface layer with carbon (monocrystals) during the standard operation of the mechanism without disassembly or with only partial disassembly.

The metal treatment composition includes a binder and a solid additive. In one embodiment the solid additive is made from a variety of natural minerals that are mixed in an elemental consistency in the following amounts:

| | |
|---|---|
| Silicon (Si) | 52.0-58.2% weight, |
| Magnesium (Mg) | 34.6-38.8% weight, |
| Iron (Fe) | 1.9-5.2% weight, |
| Aluminum (Al) | 0.35-3.5% weight, |
| Chromium (Cr) | 0.35-1.75% weight, |
| Nickel (Ni) | 0.15-1.75% weight, |
| Calcium (Ca) | 0.1-0.9% weight, |
| Manganese (Mn) | 0.04-0.2% weight, and |
| Titanium (Ti) | 0.04-0.15% weight. |

The method of making the metal treatment composition comprises the steps of grinding raw natural materials such as those listed above into a solid additive, removing impurities and oxides from the solid additive, and mechanically activating the solid additive with a binder. The method creates a powdered solid lubricant additive with a dispersity (size range) of 500 nm-40 microns.

The method of using the metal treatment composition comprises the steps of providing a metal treatment composition as described above; applying the metal treatment composition between the rubbing surfaces of a bearing or other mechanism; and burning-in the metal treatment composition during normal operation of the mechanism or though ultrasonic vibration by raising the temperature of the rubbing surfaces or other mechanical methods.

It is believed that, during the burning-in process, particles and nanoparticles of the solid additive are built up in the voids and depressions of the bearing (wear) surfaces, causing thin layers to merge with the bearing surface at the molecular level. The resulting mono crystalline/metallic surface becomes much harder and smoother than the worn surfaces, resulting is significantly less friction.

The finely dispersed and mechanically activated solid additive is a catalyst for growing mono-crystals on the bearing surfaces of metals in friction pairs, contributing to a change in the crystal lattice of the surface layer, carbonization of the surface layer on ferrous metals, and selectively compensates for clearance gap. In nonferrous metals, the surface hardness does not change but a selective optimization of clearance gaps still occurs.

During testing of the solid lubricant additive of the present invention a decrease in the friction coefficient of rubbing surfaces has been observed. Use of the additive also increased the surfaces' resistance to wear and lengthened service life, allowing for carbonization of the surface layer on cast iron and steel, optimization of clearance gaps in friction pairs, and the ability to repeatedly use the technology with only small amounts of solid lubricant additive added. As a result, a decrease in consumption of electrical power and fuel and an order of magnitude increase in service life of assemblies and mechanisms were seen.

DETAILED DESCRIPTION OF THE INVENTION

While this invention may be embodied in many forms, there will herein be described in detail one or more embodiments with the understanding that this disclosure is to be considered an exemplification of the principles of the invention and is not intended to limit the invention to the illustrated embodiments.

The invention pertains to manufacturing, operation of machines and mechanisms, and energy and resource-conservation technologies. In particular, the invention pertains to a durable anti-wear metal treatment composition (also known as a solid lubricant additive), a method of making a durable anti-wear metal treatment composition, and a method of using the metal treatment composition to form a durable anti-wear coating in friction assemblies.

I. Metal Treatment Composition (a.k.a. Solid Lubricant Additive)

In one embodiment the metal treatment composition comprises a solid additive and a binder. More particularly, the metal treatment composition may comprise from about 0.0025% to about 0.5% by weight of a solid additive, and from about 99.9975% to about 99.5% by weight binder.

The binder may comprise one or more of motor oil, industrial oil, fuel, mineral oil, synthetic oils and grease. The solid lubricant additive can be used with any of the following binders: oil (motor, industrial, and other), fuel, mineral oils (liquid mixtures of high-boiling hydrocarbons, with a boiling temperature of 300-600° C.), synthetic oils (silicon-organic liquids, ethers of phosphoric, adipic, polyalkylene glycols, and others), cup grease, and any surfactants used as dispersers during grinding.

The solid additive may comprise from about 85% to about 100% by weight varieties of natural minerals and from about 0% to about 15% by weight surfactant.

The varieties of the natural minerals may comprise:
40-70% $Mg_6[Si_4O_{10}](OH)_8$ by weight,
5-20% $Al_2[Si_4O_{10}](OH)_2$ by weight,
5-10% Amphibole by weight, and
20-40% $Mg_3[Si_2O_5](OH)_4$ by weight.

In another embodiment the varieties of natural minerals may comprise the following, and may be mixed in an elemental consistency, according to an x-ray diffraction analysis as follows:

| | |
|---|---|
| Silicon (Si) | 52.0-58.2% weight, |
| Magnesium (Mg) | 34.6-38.8% weight, |
| Iron (Fe) | 1.9-5.2% weight, |
| Aluminum (Al) | 0.35-3.5% weight, |
| Chromium (Cr) | 0.35-1.75% weight, |
| Nickel (Ni) | 0.15-1.75% weight, |

-continued

| | |
|---|---|
| Calcium (Ca) | 0.1-0.9% weight, |
| Manganese (Mn) | 0.04-0.2% weight, and |
| Titanium (Ti) | 0.04-0.15% weight. |

II. Method of Making the Metal Treatment Composition

A method of making the metal treatment composition is also provided, comprising the steps of grinding of the raw natural materials into a solid additive, removing impurities and oxides from the solid additive, and mechanically activating the solid additive with a binder. The method creates a powdered solid lubricant additive with a dispersity of 500 nm-40μ(microns).

The raw materials are ground to obtain a finely-dispersed powder with a dispersity of 500 nm to 40μ. Experimental data show that the dispersity of the composition is determined by the area of application. Therefore, the grinding of the raw minerals mixture may be done in five variants of dispersity:

1) Nano-powder with a dispersity of up to 500 nm—universal use;
2) Not more than 5μ—for fuel, hydraulic and special precision systems;
3) Not more than 10μ—for internal combustion engines;
4) Not more than 28μ—for circulating lubrication systems and bearings;
5) Not more than 40μ—for gear and chain transmissions and open-type mechanisms (pinion gears, chain transmissions).

Subsequently, the solid additive powder is mechanically activated with the binder. The finely-dispersed, mechanically activated solid additive is a catalyst for:

(1) The process of growing single crystals on the metal surface of friction pairs, contributing to a change in the crystal lattice of the metal's surface layer of friction pairs;
(2) Carbonization of the surface layer of ferrous metals (the hardness does not change in nonferrous metals), and
(3) Selective optimization of clearances between friction surfaces.

EXAMPLE 1

Method of Making a Metal Treatment Composition

Raw materials were ground into a solid additive and impurities and oxides were removed. The raw materials were a mixture containing modified forms of Ophites, Antigorite, Chrysotile, Orthochrsotile, and a small amount of Clinochrysotile and Lizardite. The resulting composition had an elemental consistency, according to an x-ray diffraction analysis, of:

| | |
|---|---|
| Silicon (Si) | 52.0-58.2% weight, |
| Magnesium (Mg) | 34.6-38.8% weight, |
| Iron (Fe) | 1.9-5.2% weight, |
| Aluminum (Al) | 0.35-3.5% weight, |
| Chromium (Cr) | 0.35-1.75% weight, |
| Nickel (Ni) | 0.15-1.75% weight, |
| Calcium (Ca) | 0.1-0.9% weight, |
| Manganese (Mn) | 0.04-0.2% weight, and |
| Titanium (Ti) | 0.04-0.15% weight. |

The components were mixed in an attrition mill under a controlled beating rate. The solid lubricant composition was subjected to mechanical activation by ultrasound or another method with a binder base of various oils or semisolid lubricants in the following ratio of:

| solid lubricant additive | 0.02% mass and |
|---|---|
| binder | 99.98% mass. |

III. Method of Use

A method of treating rubbing surfaces is also provided, comprising the following steps:

providing the metal treatment composition described above;

introducing (placing) the metal treatment composition between the rubbing surfaces of a friction assembly; and burning-in during normal operation of the mechanism or though ultrasonic vibration by raising the temperature of the rubbing surfaces.

The introduction of the activated solid lubricant additive (with a binder) into the friction assembly may be done through the normal lubrication (fuel supply or oil supply) system or by a technique of spray-coating the surface of the contact area at a specific frequency with subsequent brief break-in at normal loads and speeds for even distribution.

The main burn-in process may occur during normal operation of the mechanism.

The metal treatment method results in (1) the formation of an anti-wear coating, (2) selective carbonization of the surface layer, and (3) optimization of clearance gaps between the rubbing surfaces of the fuel, hydraulic, and precision systems, gear and chain transmissions, circulating lubrication systems and rolling and plain bearings. The tri-technical effect of the solid additive is achieved equally with different binders and surfactants due to the qualitative and quantitative compositions of the natural mineral mixture.

Combinations of these processes are accompanied by an intensive cleaning of the surface layer of contaminants and the formation of a clearly expressed regular structure on the surface coat with an obvious improvement in the rheology, load capacity, durability, and a decrease in the coefficient of friction.

The metal treatment composition may be used in internal combustion engines, presses, hydraulic pumps, compressors and other mechanisms used in various sectors of industry and agriculture.

On ferrous alloys, thermal x-ray studies have shown that, under pressure of high loads and temperatures in the bearing contact zones, water of crystallization in the composition of crystal hydrates is replaced by carbon atoms from the hydrocarbon binder penetrating into the surface of the metal. With loss of the water of crystallization, the crystals become simultaneously a catalyst for the process of carbonizing the surface layer and a skeleton for buildup of the surface coat. The saturation of the surface layer of the metal with carbon forms a surface layer coating, which is made up of Mg, Al, Si, S, Sn, K, Cl, Ca.

On nonferrous alloys, the surface geometry changes by forming a super-hard silicon carbide layer, characterized by a gray transparent color being the crystal product of carbon compounds. According to spectral analysis, the silicon carbide surface layer is made up of 25% Sn and 75% Al.

INITIAL TESTS

In a test made using an internal combustion engine of a GAZ-3221 motor vehicle from the Volga Motor Plant, it was found that 0.1-0.2 grams of the solid lubricant additive is sufficient to obtain the necessary results.

Only 2.5-7.5 grams of the solid lubricant additive was needed for the 6 VD 26/20 AL-1 diesel engine on a ship's auxiliary power unit (APU). The dosage is calculated depending on the degree of wear of the power-generating unit. Tests conducted on an SKL 6 VD 26/20 Al-1 auxiliary diesel engine on the ship "N. Chernyshevskiy", belonging to the company OJSC Volga-Flot, showed that during the navigation period, instead of wear, the condition of the engine and the fuel group improved. Compression on all cylinders increased indicating a process of restoration of the cylinder-piston group. The atomizer spray became sharp, without dripping. Fuel consumption decreased 7.3% at a load of 100 kW.

Similar tests were conducted on the Project 302 passenger ship "Leonid Krasin", built in 1989, the length of which is 129 m, breadth—16.7 m, depth—5.3 m, and a passenger capacity of 332 people. Compressor No. 13121 on this ship demonstrated a 25% increased efficiency with a decrease in electrical power consumption from 70 to 67 amperes. The tests were conducted by the head of the fleet testing group of OJSC Mosturflot, Certification of Recognition of the Federal State Institution Russian River Registry No. 1349 of 06.09.2005, D. B Kalinin.

The tests conducted on the Central Heating and Power Plant—26 of OJSC MOSENERGO jointly with specialists of RAO EES ROSSII and OJSC Firm ORGRES showed the overall efficiency of their compressor was increased from 67% to 76.8%.

At the Nizhegorod GES (Hydroelectric Power Plan), a similar compressor produced a "thermal wedge" 15 minutes after being turned on. After application of the technology, the nadirs disappeared on the cylinder surfaces, electric power consumption was reduced, and productivity doubled.

According to the results of disk-plate tests to determine the wear on bearing surfaces in machines treated with a small amount of solid lubricant additive, an increase in mass was observed instead of a decrease, as expected during normal wear.

After 30-40 minutes of operating a friction pair under load, a chemical spectral analysis did not find the presence of the solid lubricant additive in the oil. Additionally, according to the results of a spectral analysis, the wear products disappeared from the oil. This indicates that the solid additive is acting as a catalyst during the process of transferring particles at the molecular level.

As a result of all the testing, it was established that an increase of up to 10% in cylinder compression, a reduction in the fuel consumption for the diesel generator up to 2.5 kg/hour at a 100 kW, a decrease in the intensity of vibration at the engine block and support structure of up to 11.3% and 10.6% respectively.

Additional Testing—12 Liter Engine Truck

A truck (Engine Model: E7355380, 12 Liter) was tested to establish a reference baseline of performance. After the baseline test, the solid lubricant additive was added to the fuel system and the crankcase. The truck was put back into normal service. It was tested again after 9486 miles and 260 hours of operation.

Both tests were done in a truck yard and not under load. There were two significant data points taken during each test: at idle (600-650 RPM), and at 1000 RPM. The results are shown below:

| Date | 26-May | 23-Jun | |
|---|---|---|---|
| Mileage | 906,674 | 916,160 | 9,486 |
| Hours | 30,427.40 | 30,687.40 | 260.0 |

-continued

| Engine Temp: ° F. | 160 | 165 | |
|---|---|---|---|
| Consumption at Idle: Liters/Hour | 1.9 | 1.7 | 10.5% |
| Consumption at 1000 RPM: Liters/Hour | 4.0 | 3.4 | 15.0% |

The Estimated Annual Cost Savings was determined to be % 13,271.78 as calculated below:

| Miles driven between tests (28 days) | 9,486 |
|---|---|
| Pro-rated for one month (30 days) | 10,164 |
| Ave mileage of truck (MPG) | 5.5 |
| Ave Gallons of fuel per month | 1848 |
| Ave cost for gallon of fuel | $3.99 |
| Ave cost of fuel per month | $7,373.21 |
| Estimated % Saving fuel consumption | 15.0% |
| Ave Cost Saving per month | $1,105.98 |
| Ave Cost Saving per year | $13,271.78 |

The results indicate up to 15% improvement in fuel consumption. This test was done with the truck parked and not on the highway under load. Under full load at peak torque, pulling 20 to 24 tons of load, this engine would likely consume up to 30 liters per hour.

It is believed that the solid lubricant additive works by restoring the geometry of the bearing surfaces by filling the pits and voids and polishing the frictional surfaces. The surfaces become very hard and smooth, thereby reducing friction. The reduction of friction reduces wear and heat, resulting in a smoother running engine with more horsepower. Another benefit of the present method is longer time between overhauls. Any additional power achieved will help the driver by eliminating or reducing downshifting when pulling a load up a grade. Still another benefit is reduced fuel consumption.

Although the solid lubricant additive was only added to the engine fuel system and crankcase, it could also be added to the transmission(s), differential(s), and wheel bearings. In all cases it would restore the bearing surfaces and reduce friction and wear. The truck as a whole would run better, have more power, less heat, less wear, less time between major overhauls, and better mileage.

Additional Testing—1998 Honda Civic

A test was made using a 4 cylinder 1998 Honda Civic automobile. Before adding the solid lubricant additive the car had very poor compression which was different for each cylinder. The solid lubricant additive as applied and measurements were repeated after 756 miles. The results are shown on the following table:

| | Cylinder | | | | |
|---|---|---|---|---|---|
| | 1 | 2 | 3 | 4 | Mileage |
| Compression | PSI | PSI | PSI | PSI | |
| | 147.7 | 132.1 | 129.2 | 127.8 | 146,868 |
| | 149.1 | 149.1 | 149.1 | 149.1 | 147,624 |

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. A metal treatment composition comprising:
   from about 0.0025% to about 0.5% by weight of a solid additive; and
   from about 99.9975% to about 99.5% by weight binder;
   wherein the solid additive consists of:
      from about 85% to about 100% by weight of varieties of natural minerals; and
      from about 0% to about 15% by weight surfactant;
      wherein the said varieties of natural minerals are mixed in an elemental consistency, according to an x-ray diffraction analysis, of;
   52.0-58.2 wt % silicon (Si);
   34.6-38.8 wt % magnesium (Mg);
   1.9-5.2 wt % iron (Fe);
   0.35-3.5 wt % aluminum (Al);
   0.35-1.75 wt % chromium (Cr);
   0.15- 1.75 wt % nickel (Ni);
   0.1-0.9 wt % calcium (Ca);
   0.04-0.2 wt % manganese (Mn); and
   0.04-0.15 wt % titanium (Ti).

2. The metal treatment composition of claim 1 wherein the varieties of natural minerals comprises:
   40-70% $Mg_6[Si_4O_{10}](OH)_8$ by weight;
   5-20% $Al_2[Si_4O_{10}](OH)_2$ by weight;
   5-10% Amphibole by weight; and
   20-40% $Mg_3[Si_2O_5](OH)_4$ by weight.

3. The metal treatment composition of claim 1 wherein the binder comprises one or more of motor oil, industrial oil, fuel, mineral oil, synthetic oils and grease.

4. The metal treatment composition of claim 1 comprising about 0.02 wt % solid additive and about 99.98 wt % binder.

5. A method of making the metal treatment composition of claim 1 comprising the following steps:
   grinding varieties of natural minerals mixture into a solid additive, the mixture comprising $Mg_6[Si_4O_{10}](OH)_8$, $Al_2[Si_4O_{10}](OH)_2$, amphibole, and $Mg_3[Si_2O_5](OH)_4$;
   removing impurities and oxides from the solid lubricant; and
   mechanically activating the solid lubricant with a binder.

6. The method of claim 5 further comprising grinding with the addition of a surfactant, with the resulting solid lubricant having a dispersity of 500 nm-40 microns.

7. The method of claim 5 further comprising grinding with the addition of a surfactant, with the resulting solid lubricant having a dispersity of not more than 5 μ.

8. The method of claim 5 further comprising grinding with the addition of a surfactant, with the resulting solid lubricant having a dispersity of not more than 40 μ.

9. The method of claim 5 wherein the mechanical activation step is achieved using ultrasound.

10. A method of treating rubbing surfaces, comprising the following steps:
    providing a metal treatment composition according to claim 1;
    placing the metal treatment composition between the rubbing surfaces; and
    burning-in the metal treatment composition.

11. The method of treating rubbing surfaces of claim 10, wherein the burning in takes place during normal operation of the mechanism.

12. The method of treating rubbing surfaces of claim 10, wherein the burning in takes place though ultrasonic vibration.

13. The method of treating rubbing surfaces of claim 10, wherein the placing step comprises introducing the metal treatment composition into a fuel supply.

14. The method of treating rubbing surfaces of claim 10, wherein the placing step comprises introducing the metal treatment composition into an oil supply.

15. The method of treating rubbing surfaces of claim 10, wherein the rubbing surfaces are components of an internal combustion engine in a vehicle used for hauling loads, and wherein the placing step comprises spray-coating the rubbing surfaces at a specific frequency with subsequent break in at normal loads and engine speeds.

* * * * *